United States Patent [19]
Inage et al.

[11] Patent Number: 6,004,010
[45] Date of Patent: Dec. 21, 1999

[54] LIGHT SOURCE DEVICE OF LIQUID CRYSTAL PROJECTOR

[75] Inventors: Hisao Inage, Yokosuka; Munenori Ikeda, Yokohama, both of Japan

[73] Assignees: Hitachi, Ltd., Tokyo, Japan; Hitachi Video & Information System, Inc., Kanagawa-ken, Japan

[21] Appl. No.: 08/984,395

[22] Filed: Dec. 3, 1997

[30]  Foreign Application Priority Data

Dec. 6, 1996 [JP] Japan .................................. 8-326481

[51] Int. Cl.[6] ...................................................... F21V 29/00
[52] U.S. Cl. ........................ 362/294; 362/373; 362/360; 362/351
[58] Field of Search ................................... 362/294, 373, 362/297, 304, 310, 351, 360

[56]  References Cited

U.S. PATENT DOCUMENTS

| | | | |
|---|---|---|---|
| 4,630,182 | 12/1986 | Moroi et al. | 362/294 |
| 4,885,668 | 12/1989 | Maglica et al. | 362/294 |
| 5,034,866 | 7/1991 | Pujol | 362/373 |
| 5,138,541 | 8/1992 | Kano | 362/373 |
| 5,207,505 | 5/1993 | Naraki et al. | 362/373 |

FOREIGN PATENT DOCUMENTS 64-84290  3/1989  Japan .

*Primary Examiner*—Thomas M. Sember
*Attorney, Agent, or Firm*—R. William Beard, Jr.; Frohwitter

[57]  ABSTRACT

A liquid crystal projector having a light source device which comprises a first reflective mirror surrounding a light source; a second reflective mirror which is disposed before the first mirror in the light emission direction and has a convergent shape with respect to the light source; a lamp house surrounding the light source, the first and second mirrors, and having an opening for cooling the light source positioned behind the first mirror; a first lamp shade disposed behind the light source and the first mirror, and having an area of an appropriate transverse cross section of a phantom cone or pyramid which is defined by a series of phantom linear lines connecting the light source and the contour of the opening for cooling the light source; and a second lamp shade disposed outside a curved wall of the first mirror and before the light source.

5 Claims, 2 Drawing Sheets

LIGHT SOURCE DEVICE OF LIQUID CRYSTAL PROJECTOR

BACKGROUND OF THE INVENTION

The present invention relates to a liquid crystal projector for projecting on a screen with a magnified output image from a personal computer, CD, video, or the like, especially to a structure thereof for preventing leakage of a light from a light source, improving a cooling efficiency of a light source region and reducing an air current noise from a cooling fan.

There has been used a liquid crystal projector in which an optical image signal formed on a light bulb is radiated by a lighting means and projected onto a screen as a magnified image by means of a projector. There have been proposed also a number of light bulbs with utilization of a liquid crystal display element. A known twisted nematic (TN) type of one of liquid crystal display elements comprises a pair of transparent substrates which have transparent electrode film coats and between which a liquid crystal is filled. At a front and a back sides of the liquid crystal display element, two polarizers are disposed, respectively, in such a manner that the polarizers differ in polarizing direction from each other by an angle of 90 degrees. In such liquid crystal display element, a permeated light quantity of an incident light is controlled to display an image information by combining an action of rotating a polarizing face by an electro-optical effect of the liquid crystal and an action of selecting a polarizing component of the polarizers.

A presentation is made using an image display device by disposing a liquid crystal projector in front of listeners (or audience). In this case, light leakage from a light source deteriorates a quality of image or a contrast on a screen, or a light is flashed directly upon eyes of the listeners uncomfortably. Also, heat generated from the light source not only shortens a life of the light source but gives an adverse influence onto components of the liquid crystal projector. To solve the problem, as disclosed in JP-A-64-84290, a louver as a shade is associated with a lamp house or a housing of the light source to intercept a leak light while a cooling air current can pass through openings of the louver.

In detail, a light source consists of a light emitting portion and a reflective mirror which radiates a light emitted from the light source onto an irradiation face as a target. The reflective mirror is subjected to a dichroic treatment so that unnecessary lights like as an extreme infrared light and a ultraviolet light other than a visible light permeated through the reflective mirror without being reflected by the reflective mirror. Because such unnecessary lights exchange heat in a liquid crystal panel, a polarizing plate and other optical components, and influence the components. The dichroric reflective mirror allows not only unnecessary lights but also a visible light to permeate therethrough. The light which is emitted from the light source and permeates through the reflective mirror leaks and causes problems.

On the other hand, regarding the cooling of the light source region, because of a large output, it is designed to obtain an increased cooling effect by providing the cooling fan in the vicinity of the light source. In this case, a cooling air current path needs to be narrowed for the light leakage. Therefore, when the cooling fan is operated, an eddy airflow arises around the louver and a noise is generated when the cooling air current passes through the louver.

In the presentation mentioned above, the output of the light source tends to be increased such that the presentation can be effected in a lighted hall. This causes problems of the overheating of the light source device and the cooling air current noise and amplifys the light leakage problem mentioned above. In the conventional method using the louver, the light leakage and the cooling efficiency contradict each other. In order to intercept the leak light, a dimension of an opening area of the louver needs to be reduced. However, when a passage area of the cooling air current is reduced, the cooling efficiency of the light source device becomes lower and a noise is increased. There has been tried a structural modification of the louver, and proposed a way of overlapping louver fins. However, such known ways are unsatisfactory.

SUMMARY OF THE INVENTION

An object of the invention is to provide a liquid crystal display by which defects of the prior art are improved and there can be realized preventing a light leakage from a light source, improving cooling efficiency of a light source region, lowering a cooling air current noise and so on.

To solve the problems of the prior art, the inventors put an importance to the cooling efficiency so that a cooling air current path is positively provided to increase a radiation effect. Providing the cooling air current path, an eddy air current is decreased and an air current noise is lowered. In usual, the entire display device is made compact, since portability of liquid crystal projectors is important. Thus, a cooling fan is disposed adjacent to the light source which has a highest heat radiation in the device. In order to cool the light source region, a predetermined quantity of the cooling air current in a lamp house needs to be ensured. For this purpose, a resistance against the cooling air current needs to be removed as much as possible from the cooling air current path connecting the cooling fan and the lamp house. In this case, it is most preferable that a louver is omitted from the lamp house since the louver shuts all the cooling air current paths in the lamp house. It is noted that such a structure has been regarded as necessary for preventing the light leakage from the light source with the louver.

The inventors have noticed the relationship between the position of the light source causing a light leakage and the lamp house, and have found that a shade structure for the light provided within an light emanating angle connecting the periphery of an opening of the lamp house and the light source can prevent the light leakage. A measurement of the contour of such shade structure can be made smaller in a position closer from the lamp house opening to the light source. A space in the shade lamp house can be secured as the cooling air current path by which the light source can be well cooled.

According to a first feature of the invention, there is provided a liquid crystal projector having a light source device which comprises a light source and a lamp shade disposed behind a reflective mirror. The lamp shade has an area of an appropriate transverse cross section of a phantom cone or pyramid which is defined by a series of phantom linear lines connecting the light source and contour of an opening for cooling the light source formed in a covering structure for the light source. A typical example of such covering structure is a lamp house. By applying a reflectivity lowering treatment to an inner surface of the lamp house, a stray light within the lamp house are effectively reduced. As such treatment of lowering reflectivity, a non-reflective treatment, a surface roughening treatment, an application of a low reflectivity material coat and the like can be raised.

According to a second feature of the invention, there is provided a liquid crystal projector having a light source device comprising:

a) a light source;

b) a first reflective curvature mirror which surrounds the light source;

c) a second reflective mirror which is disposed before the first reflective curvature in the light emission direction and has a convergent shape with respect to the light source;

d) a lamp house which surrounds the light source, the first reflective curvature mirror and the second reflective mirror, and which has an opening for cooling the light source positioned behind the first reflective curvature mirror;

e) a first lamp shade disposed behind the light source and the first reflective curvature mirror, and having an area of an appropriate transverse cross section of a phantom cone or pyramid which is defined by a series of phantom linear lines connecting the light source and the contour of the opening for cooling the light source; and f) a second lamp shade disposed outside a curved wall of the first reflective curvature mirror and before the light source with respect to the light emission direction.

According to a third feature of the invention, there is provided a liquid crystal projector which comprises:

a) a light source device which has a reflective mirror surrounding a light source; a lamp house surrounding the light source and the reflective mirror and having an opening for cooling the light source positioned behind the reflective mirror; and a lamp shade having an area of an appropriate transverse cross section of a phantom cone or pyramid which is defined by a series of phantom linear lines connecting a light source and the contour of the opening for cooling the light source, b) a cooling fan disposed behind the opening for cooling the light source of the lamp house for passing a cooling air current through the opening for cooling the light source, and c) fan guards disposed before and behind the cooling fan outside the opening for cooling the light source of the lamp house.

Other objects and features of the invention will be further clarified by the following description with reference to accompanying drawings.

DETAILED DESCRIPTION OF THE PREFERRED EMBODIMENT

Embodiments of the present invention are now described with reference to the attached drawings.

Figure 1:
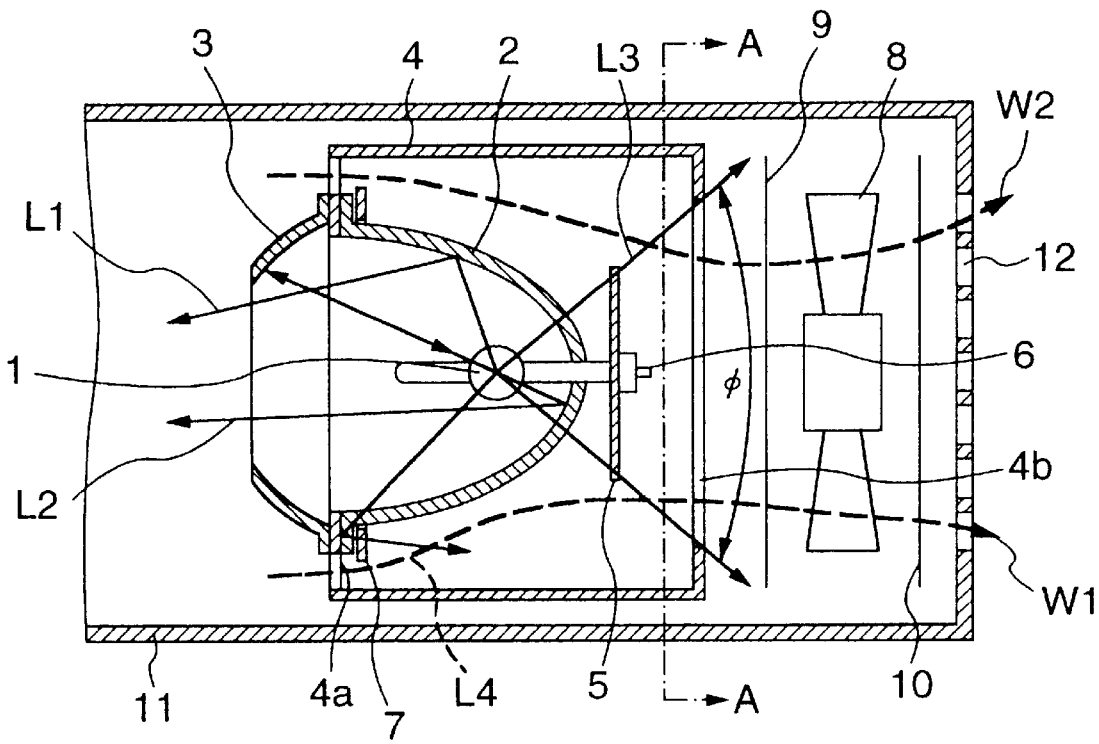
FIG. 1 is a schematic sectional view taken along the axis of a first embodiment of the light source device according to the invention.
Figure 2:
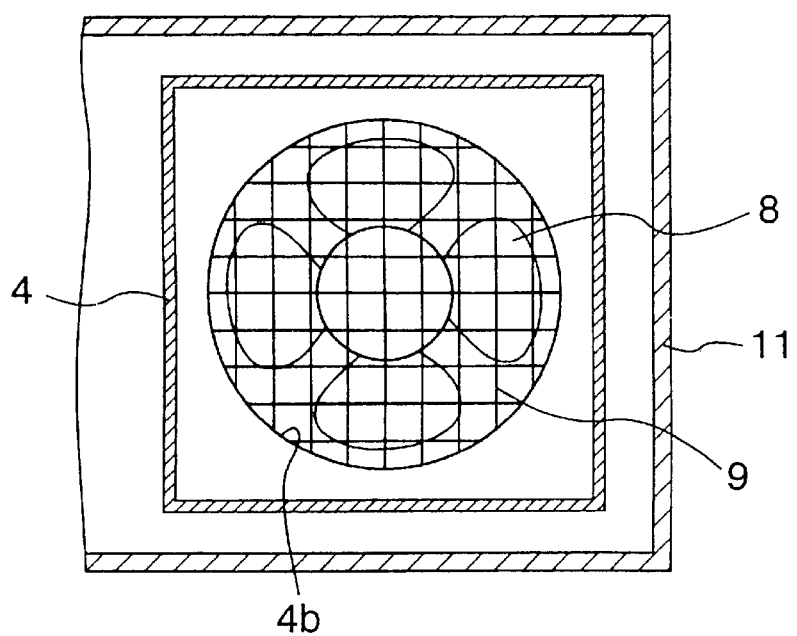
FIG. 2 is a cross sectional view taken along the line A—A in FIG. 1.

In FIGS. 1 and 2, numeral 1 denotes a light source made of metal halide, for example, 2 a first reflective curvature mirror for example, an ellipsoidal mirror, and 3 a second reflective mirror, for example, a spherical mirror. The both reflective mirrors are fixed on an emanating end wall 4a of a lamp house 4 with springs, screws and the like. The second reflective mirror 3 catches a light which is emitted from the light source 1 and cannot be catched by the first reflective curvature mirror. Numeral 5 denotes a first lamp shade fixed on an electrode terminal 6 which supplys a power to the light source 1, and 7 a second lamp shade fixed on a flange portion of the first reflective curvature mirror 2. There is placed a cooling fan 8 behind the first lamp shade 5 and further the lamp house 4. There are placed a first and a second fan guards 9 and 10 before and behind the cooling fan 8, respectively. Numerals 11 denotes a housing which surrounds the light source device, and another optical system and circuit (not shown). Further there is provided a louver 12 in the housing 11 in order to exhaust a cooling air current out of the housing like as a conventional device.

With regard to the liquid crystal projector having the above structure, a function of shading from a leak light will be described below. Useful lights among the lights emitted from the light source 1 include light L1 reflected by the first reflective curvature mirror 2 and light L2 reflected by the second reflective mirror 3. These lights are useful lights for projecting an image information and the like onto a screen.

On the other hand, an extreme infrared light, a ultraviolet light, a permeated light and other lights that cause a light leakage include a light L3 which is transmitted through the first reflective curvature mirror 2 and emitted in a reverse direction to that of the useful lights, and a light L4 which is emitted from the light source 1 in the direction of the useful lights, transmitted through the first reflective curvature mirror, reflected by the emanating end wall 4a of the lamp house and emitted in the reverse direction to that of the useful lights. The light L3 which directly permeates through the first reflective curvature mirror 2, lights within the angle range (see angle Φ in FIG. 1) defined a series of phantom linear lines connecting the contour of an opening 4b of the lamp house 4 and the light source pass through the lamp house opening 4b and further the cooling fan 8 to leak out of the louver 12 of the housing 11. Thus, in the case where a shade member, which has a diametric size corresponding to the above angle Φ or a larger size than the angle Φ, is disposed between the first reflective curvature mirror 2 and the opening 4b of the lamp house, there will be no leakage of the light L3. The first lamp shade 5 is provided for such reason. The first lamp shade is not restricted to a specific material but if the lamp shade is directly or indirectly connected to the electrode terminal of the light source 1, preferably it is made of a material which acts no electric influence on the light source when light emitting from the light source. If the first lamp shade 5 covers the above angle restricted, it may have any form and be positioned appropriately. The angle Φ is described with relation to the lamp house opening 4b, but in the case where there is disposed another structural member which overlaps the angle range defined by the size of the opening 4b, a shade angle is defined by a series of phantom linear lines which connect the structural member and the light source 1. It is clear that, for example, if the housing louver 12 has an opening smaller than the lamp house opening 4b, the shading angle is defined by the light source 1 and the louver.

On the other hand, in order to shade lights including light L4 which are reflected by the emanating end wall 4a of the lamp house 4 and advance to the opening 4b, any structure member which can cover the reflective light range defined by the opening 4b may be available. In the embodiment, the second lamp shade 7 can prevent light L4 reflected by the lamp house emanating end wall 4a to leak out through the lamp house opening 4b. The lamp shade may be made from any materials which can shade a leakage light.

A cooling air current path for the light source device is now described. As is stated above, since a light leakage can be well prevented by the first and second lamp shades 5 and 7, it is unnecessary to dispose a louver for shading lights in the lamp house opening 4b. Thus, as shown in FIG. 2, the lamp house can have the opening 4b without a louver or another obstruction. Noted is that, since the first lamp shade 5 in the lamp house can be fully smaller than the lamp house, it is possible to ensure a cooling air current path of low resistance in the lamp house. It is also noted that, since the louver 12 attached to the housing 11 is not required to be a light shade, its openings can be fully large. Referring to FIG. 1, cooling air currents flow in the lamp house like as dotted lines W1 and W2. It is possible to fully cool the respective portions of the light source device, since in the lamp house 4 there is omitted an obstruction which resists against the cooling air currents. Further, since there is omitted an obstruction causing an eddy air current in the lamp house 4, an air flow noise is reduced.

The first and second fan guards shown in FIG. 1 prevent foreign objects from entering into the housing 11 and the lamp house 4 through the housing louver 12 and the lamp house opening 4b. The fan guards are preferably made from a round wire material, and of a metal wire netting, for example. The fan guards made from the round wire material hardly cause an eddy air current, and have less resistance against the cooling air flow not so as to produce an air flow noise.

Figure 3:
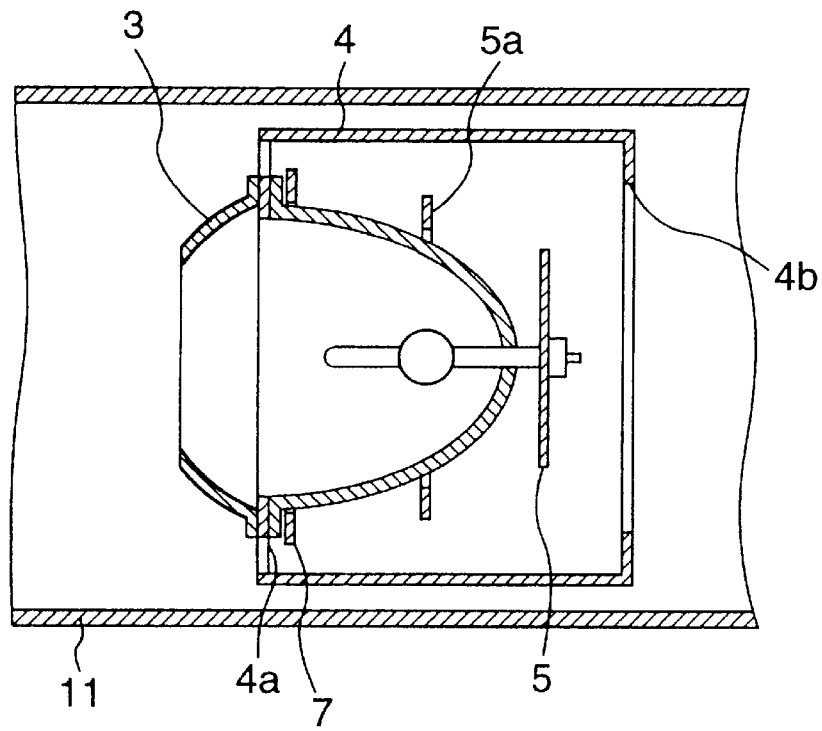
FIG. 3 is a schematic sectional view taken along the axis of a second embodiment of an essential portion of the light source device according to the invention.

An alternative of the invention is described below. FIG. 3 is a longitudinal sectional view of a light source device comprising a plurality of lamp shades which comprises a third lamp shade 5a and can more effectively shade leakage lights. This suitably prevents straying light reflected by an inner surface except for the opening 4b of the lamp house 4 from leaking out of the housing. There are of course alternative ways of preventing light straying in the lamp house, which comprise: a) the lamp house inner surface is subjected to a non-reflective treatment; and b) the lamp house inner surface is coated with a material having small reflectivity.

Figure 4:
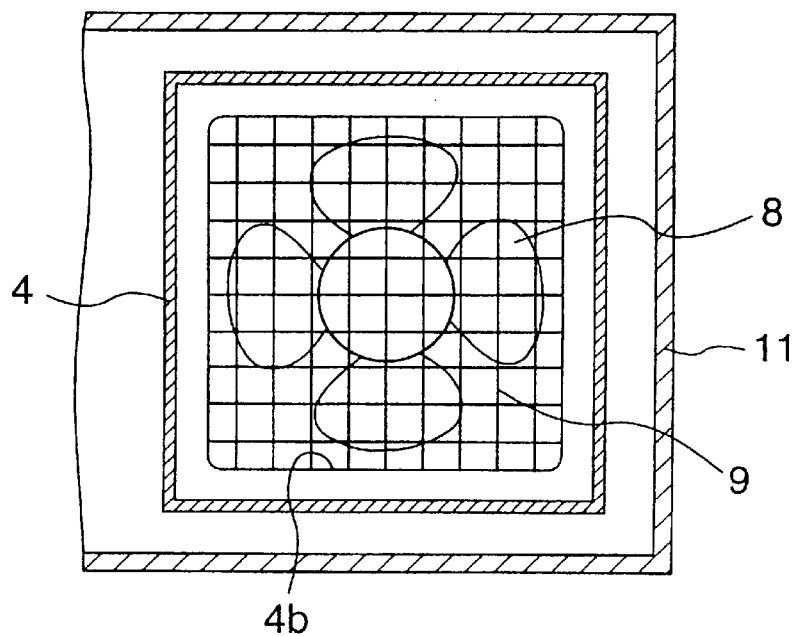
FIG. 4 is a cross sectional view showing an essential portion of another embodiment of the light source device according to the invention.

FIG. 4 shows an alternative of the embodiment shown in FIG. 2, in which the lamp house opening 4b is not circular but rectangular. This means that, in the case where there is not attached a louver in the opening, the opening can have any configurations.

In the described liquid crystal projector of the invention, a structure is proposed, which comprises the lamp shades the instead of the conventional louver for light shading. According to such structure, it is possible to securely prevent lights which are emitted from the light source and permeate through the reflective mirrors to leak out of the housing. Further, according to the structure, since there is no obstruction resisting the cooling air current, a cooling efficiency of the light source device is improved. In the structure, an air flow noise is reduced, since there is no narrow cooling air flow path causing an eddy air flow.

The present invention is not restricted to the above described embodiments and includes other alternatives without departing from the spirit and the key aspect thereof. The scope of the invention is recited in the attached claims. Further, the invention includes any modifications and alternative within the scope of the claims and equivalents thereof.

What is claimed is:

1. A liquid crystal projector having a light source device which comprises:

a light source having an electrode terminal; and a lamp shade disposed behind a reflective mirror, wherein said lamp shade has an area of an appropriate transverse cross section of a phantom cone or pyramid, wherein said lamp shade is affixed to said electrode terminal, wherein said phantom cone or pyramid is defined by a series of phantom linear lines connecting the light source and the contour of an opening for cooling the light source, and wherein said opening for cooling the light source is formed in a covering structure for said light source, wherein said lamp shade comprises a material which electrically insulates the light source.

2. The liquid crystal projector according to claim 1, wherein said covering structure is of a lamp house.

3. The liquid crystal projector according to claim 2, wherein said lamp house has an inner surface which is to provide a low reflectivity.

4. A liquid crystal projector having a light source device which comprises:

a) a light source;
b) a first reflective curvature mirror which surrounds the light source, wherein said first reflective curvature mirror reflects light emitted from said light in a light emission direction;
c) a second reflective mirror which is disposed at a front side of said first reflective curvature mirror with respect to the light emission direction and has a convergent shape with respect to the light source;
d) a lamp house which surrounds the light source, said first reflective curvature mirror and said second reflective mirror, said lamp house having an opening for cooling the light source positioned behind said first reflective curvature mirror;
e) a first lamp shade which is disposed behind the light source and said first reflective curvature mirror, said first lamp shade having an area of an appropriate transverse cross section of a phantom cone or pyramid which is defined by a series of phantom linear lines connecting the light source and a contour of said opening for cooling the light source; and
f) a second lamp shade disposed outside a curved wall of said first reflective curvature mirror and before the light source with respect to the light emission direction.

5. A liquid crystal projector which comprises:

a) a light source device which has a reflective mirror surrounding a light source; a lamp house surrounding the light source and the reflective mirror said lamp house having an opening for cooling the light source positioned behind said reflective mirror; an electrode terminal connected to said light source and a lamp shade having an area of an appropriate transverse cross section of a phantom cone or pyramid which is defined by a series of phantom linear lines connecting a light source and the contour of said opening for cooling the light source, wherein said lamp shade comprises a material which electrically insulates the light source and is affixed to said electrode terminal;
b) a cooling fan disposed further behind said opening for cooling the light source of said lamp house for passing a cooling air current through said opening for cooling the light source; and
c) fan guards disposed before and behind said cooling fan outside said opening for cooling the light source of said lamp house.

* * * * *